United States Patent
Tahara et al.

(10) Patent No.: US 10,144,373 B2
(45) Date of Patent: Dec. 4, 2018

(54) POWER SUPPLY SYSTEM CONTROL DEVICE AND POWER SUPPLY SYSTEM CONTROL METHOD

(71) Applicant: NISSAN MOTOR CO., LTD., Kanagawa (JP)

(72) Inventors: Masahiko Tahara, Kanagawa (JP); Terumasa Tsuchiya, Kanagawa (JP); Atsushi Tezuka, Kanagawa (JP); Tomoyuki Koike, Kanagawa (JP); Munemitsu Watanabe, Kanagawa (JP); Akifumi Koishi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/576,184

(22) PCT Filed: May 22, 2015

(86) PCT No.: PCT/JP2015/064797
§ 371 (c)(1),
(2) Date: Nov. 21, 2017

(87) PCT Pub. No.: WO2016/189593
PCT Pub. Date: Dec. 1, 2016

(65) Prior Publication Data
US 2018/0134240 A1    May 17, 2018

(51) Int. Cl.
*B60R 16/00* (2006.01)
*B60R 16/033* (2006.01)
(Continued)

(52) U.S. Cl.
CPC .......... *B60R 16/033* (2013.01); *B60R 16/005* (2013.01); *B60R 16/03* (2013.01);
(Continued)

(58) Field of Classification Search
None
See application file for complete search history.

(56) References Cited

U.S. PATENT DOCUMENTS

| 2011/0227617 | A1* | 9/2011 | Jang | H03L 7/093 |
|---|---|---|---|---|
| | | | | 327/157 |
| 2013/0090797 | A1* | 4/2013 | Izumi | B60L 11/123 |
| | | | | 701/22 |

(Continued)

FOREIGN PATENT DOCUMENTS

| DE | 102011054582 A1 | 4/2012 |
|---|---|---|
| DE | 10 2011 056 270 A1 | 6/2012 |

(Continued)

OTHER PUBLICATIONS

International Preliminary Report on Patentability issued in Application No. PCT/JP2015/064797, dated Dec. 7, 2017 (12 pages).

*Primary Examiner* — Jared Fureman
*Assistant Examiner* — Aqeel Bukhari
(74) *Attorney, Agent, or Firm* — Osha Liang LLP

(57) ABSTRACT

A power supply system control device for controlling a power supply system including an electric generator, a first electricity storage configured to be charged with and to discharge electric power generated by the electric generator, a second electricity storage configured to be charged with and to discharge the generated electric power, two paths connecting between the first electricity storage and the second electricity storage, a switching unit including a first switch configured to switch between a conductive state and a non-conductive state of one of the paths, and a second switch configured to switch between a conductive state and a non-conductive state of the other of the paths, and an electric load of a vehicle that is connected to the first electricity storage side of the switching unit.

6 Claims, 10 Drawing Sheets

(51) Int. Cl.
*H02J 7/14* (2006.01)
*B60R 16/03* (2006.01)
*B60R 16/04* (2006.01)
*F02N 11/08* (2006.01)

(52) U.S. Cl.
CPC .......... *B60R 16/04* (2013.01); *F02N 11/0837* (2013.01); *H02J 7/1423* (2013.01); *H02J 7/1446* (2013.01)

(56) References Cited

U.S. PATENT DOCUMENTS

2015/0239411 A1* 8/2015 Nakajima ............. B60R 16/033
 307/10.6
2015/0291039 A1* 10/2015 Sakata ................ H01M 10/441
 307/10.1

FOREIGN PATENT DOCUMENTS

| JP | 2004-222473 A | 8/2004 |
|----|---------------|--------|
| JP | 2012-081840 A | 4/2012 |
| JP | 2012-254744 A | 12/2012 |
| JP | 2014-034376 A | 2/2014 |
| JP | 5494498 B2 | 5/2014 |

* cited by examiner

POWER SUPPLY SYSTEM CONTROL DEVICE AND POWER SUPPLY SYSTEM CONTROL METHOD

BACKGROUND

Technical Field

The present invention relates to control of a power supply system of a vehicle including two secondary batteries.

Related Art

There is a known vehicular power supply system that includes a lithium-ion battery and a lead battery as two secondary batteries. JP 5494498B describes, as control of such a power supply system, voltage-variable control in which the voltage (set voltage) of electric power output from an electric generator is variably controlled. Furthermore, according to the description of this document, when electric loads (e.g., headlights and windshield wipers) that require high voltage have been actuated, the voltage-variable control is prohibited by fixing the set voltage between a voltage upper limit and a voltage lower limit of the voltage-variable control, or control for reducing an upper limit of the set voltage and increasing a lower limit of the set voltage is performed in the voltage-variable control.

SUMMARY OF INVENTION

The control described in the foregoing document is started when the windshield wipers and the like have been actuated. Therefore, for example, if there is conduction between the electric generator and the lithium-ion battery when the required voltage has increased, the generated electric power is absorbed by the lithium-ion battery even if the power generation voltage of the electric generator is increased in response to the increase in the required voltage. This causes a delay in an increase in the voltage supplied to the electric loads.

One or more embodiments of the present invention provides a control device and a control method that can supply electric power without delay in response to an increase in the voltage required by electric loads.

According to one or more embodiments of this invention, there is provided a power supply system control device for controlling a power supply system that includes an electric generator, first electricity storage means capable of being charged with and discharging electric power generated by the electric generator, second electricity storage means capable of being charged with and discharging the generated electric power, two paths connecting between the first electricity storage means and the second electricity storage means, switching means including a first switch configured to switch between a conductive state and a non-conductive state of one of the paths, and a second switch configured to switch between a conductive state and a non-conductive state of the other of the paths, and an electric load of a vehicle being connected to the first electricity storage means side of the switching means. When the power supply system control device determines that actuation of the electric load has a possibility of requiring higher voltage than normal, it increases a remaining amount of charge in the second electricity storage means in advance.

DETAILED DESCRIPTION

The following describes embodiments of the present invention with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
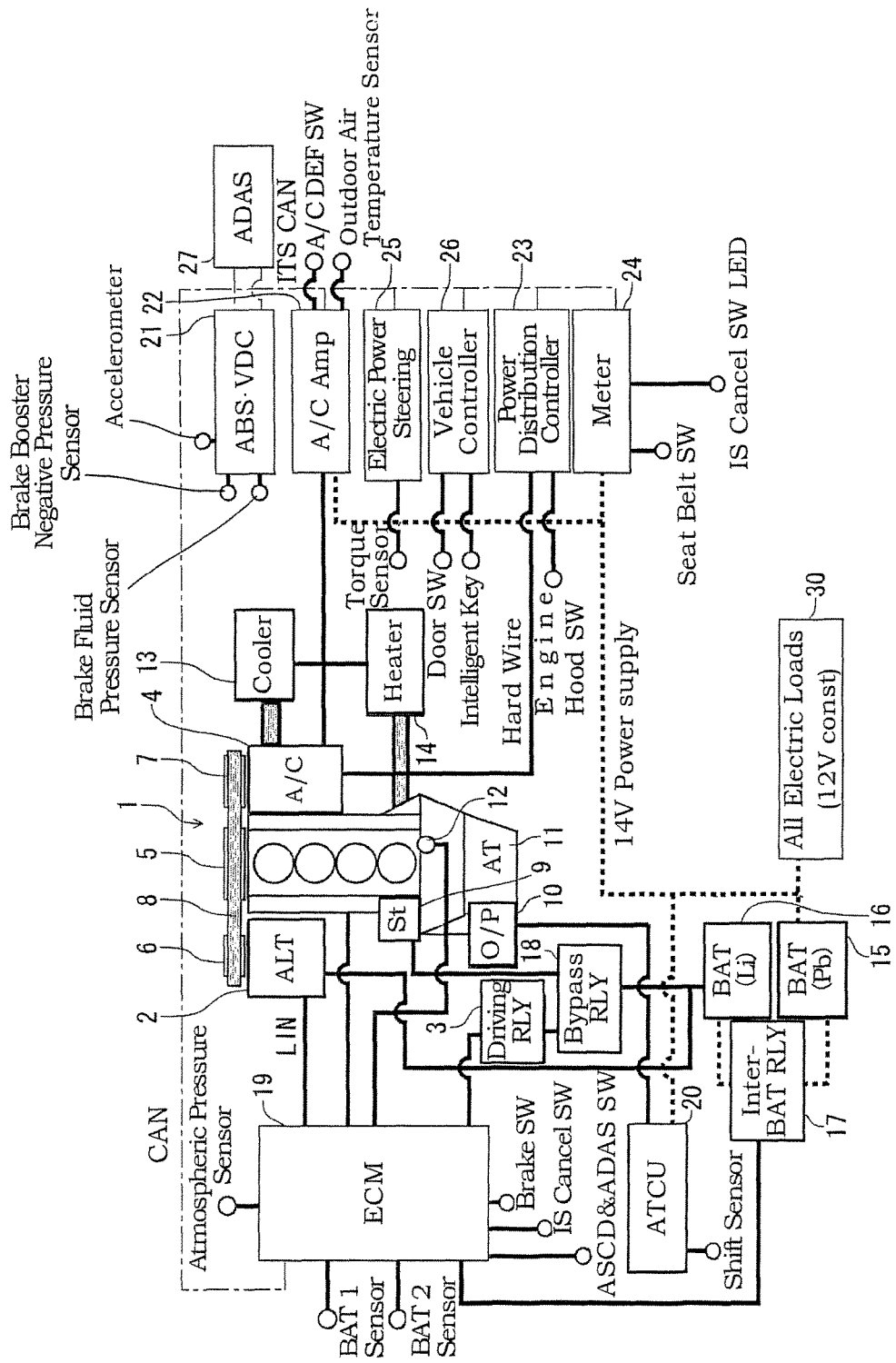
FIG. 1 is a schematic diagram of an engine system according to one or more embodiments of the present invention.

FIG. 1 is a schematic diagram of a system of an engine having an idling stop function according to one or more embodiments of the present invention.

As shown in FIG. 1, in an engine 1, an electric generator 2 and an air conditioner compressor 4 are provided respectively at one side and the other side, each via a non-illustrated bracket and the like. A belt 8 is wound across a crank pulley 5 mounted on a distal end of a crankshaft of the engine 1, an electric generator pulley 6 mounted on a distal end of a rotation shaft of the electric generator 2, and a compressor pulley 7 mounted on a distal end of a rotation shaft of the air conditioner compressor 4. Thus, the crank pulley 5, the electric generator pulley 6, and the compressor pulley 7 are mechanically joined to one another.

Although the three pulleys, i.e., the crank pulley 5, the electric generator pulley 6, and the compressor pulley 7 are mechanically joined to one another using one belt 8 in FIG. 1, each of the electric generator pulley 6 and the compressor pulley 7 may be mechanically joined to the crank pulley 5 using an individual belt 8. The belt(s) may be replaced with a chain(s).

The engine 1 includes a starter 9 located in the vicinity of a junction with an automatic transmission 11. Similarly to an ordinary starter for startup, the starter 9 includes a pinion gear that moves forward and backward. When the starter 9 is actuated, the pinion gear engages with a gear provided on an outer periphery of a drive plate mounted on a proximal end portion of the crankshaft, thereby performing cranking. A supply of electric power to the starter 9 will be described later.

The automatic transmission 11 includes an electric oil pump 10 for securing a control hydraulic pressure during the idling stop. The electric oil pump 10 is actuated in response to an instruction from an automatic transmission controller 20, and improves responsiveness when starting from the idling stop.

The electric generator 2 generates electric power while being driven by a driving force of the engine 1. In generating the electric power, the power generation voltage can be variably controlled via Local Interconnect Network (LIN) communication or a hard wire. The electric generator 2 can also regenerate kinetic energy of a vehicle as electric power during deceleration of the vehicle. Control over such power generation and regeneration is performed by an engine control module (ECM) 19.

The ECM 19 reads in detection signals from various types of sensors including a crank angle sensor 12, a battery sensor, and an atmospheric pressure sensor, as well as signals from various types of switches including a brake switch, to control a fuel injection amount, an ignition timing, the idling stop, and the like. Furthermore, the ECM 19 performs optimal control for the vehicle through intercommunication with an ABS/VDC unit 21, an air conditioner amplifier 22, an electric power steering unit 25, a vehicle controller 26, a power distribution controller 23, a meter unit 24, and an advanced driver assistance system (ADAS) unit 27 via a controller area network (CAN).

Note that the ECM 19 is composed of a microcomputer provided with a central processing unit (CPU), a read-only memory (ROM), a random-access memory (RAM), and an input/output (I/O) interface. The ECM 19 can be composed of a plurality of microcomputers.

The system shown in FIG. 1 includes two secondary batteries: a lead storage battery serving as first electricity storage means, and a non-aqueous electrolyte secondary battery serving as second electricity storage means. Hereinafter, the lead storage battery will be referred to as a lead-acid battery 15, and the non-aqueous electrolyte secondary battery will be referred to as a lithium-ion secondary battery 16. It will be assumed that an open-circuit voltage of the lead-acid battery 15 in a fully-charged state is 12.7 V, and an open-circuit voltage of the lithium-ion secondary battery 16 in a fully-charged state is 13.1 V.

As will be described later, the lead-acid battery 15 and the lithium-ion secondary battery 16 are connected in parallel to each other via two paths C1 and C2. A MOSFET 50 and a lead-acid battery path relay 51, which function as switching means, are connected to the paths C1 and C2, respectively.

The lead-acid battery 15 supplies electric power to all electric loads 30. Especially in the present system, the lead-acid battery path relay 51 is placed in an OFF state (a non-conductive state) to prevent the influence of a momentary voltage drop (hereinafter also referred to as a momentary drop) caused by driving of the starter 9 in a phase for commencing the automatic engine restart from the idling stop. Consequently, voltage for actuating all electric loads 30 is guaranteed.

Both of the lead-acid battery 15 and the lithium-ion secondary battery 16 are charged using the electric power generated by the electric generator 2 (including the regenerated electric power; the same goes for the following description).

Note that voltage adjustment is made through field current control by the electric generator 2 when supplying electric power from the lead-acid battery 15 and the lithium-ion secondary battery 16 to all electric loads 30, and when charging the lead-acid battery 15 or the lithium-ion secondary battery 16 using the electric power generated by the electric generator 2.

In the foregoing system, ordinary idling stop control is performed. Specifically, the engine 1 is automatically stopped when certain conditions are satisfied, for example, when an accelerator pedal is fully closed, when a brake pedal is in a depressed state, and when a vehicle speed is equal to or lower than a predetermined vehicle speed. On the other hand, the engine 1 is automatically restarted when, for example, a brake pedal depression amount is equal to or smaller than a predetermined amount.

Figure 2:
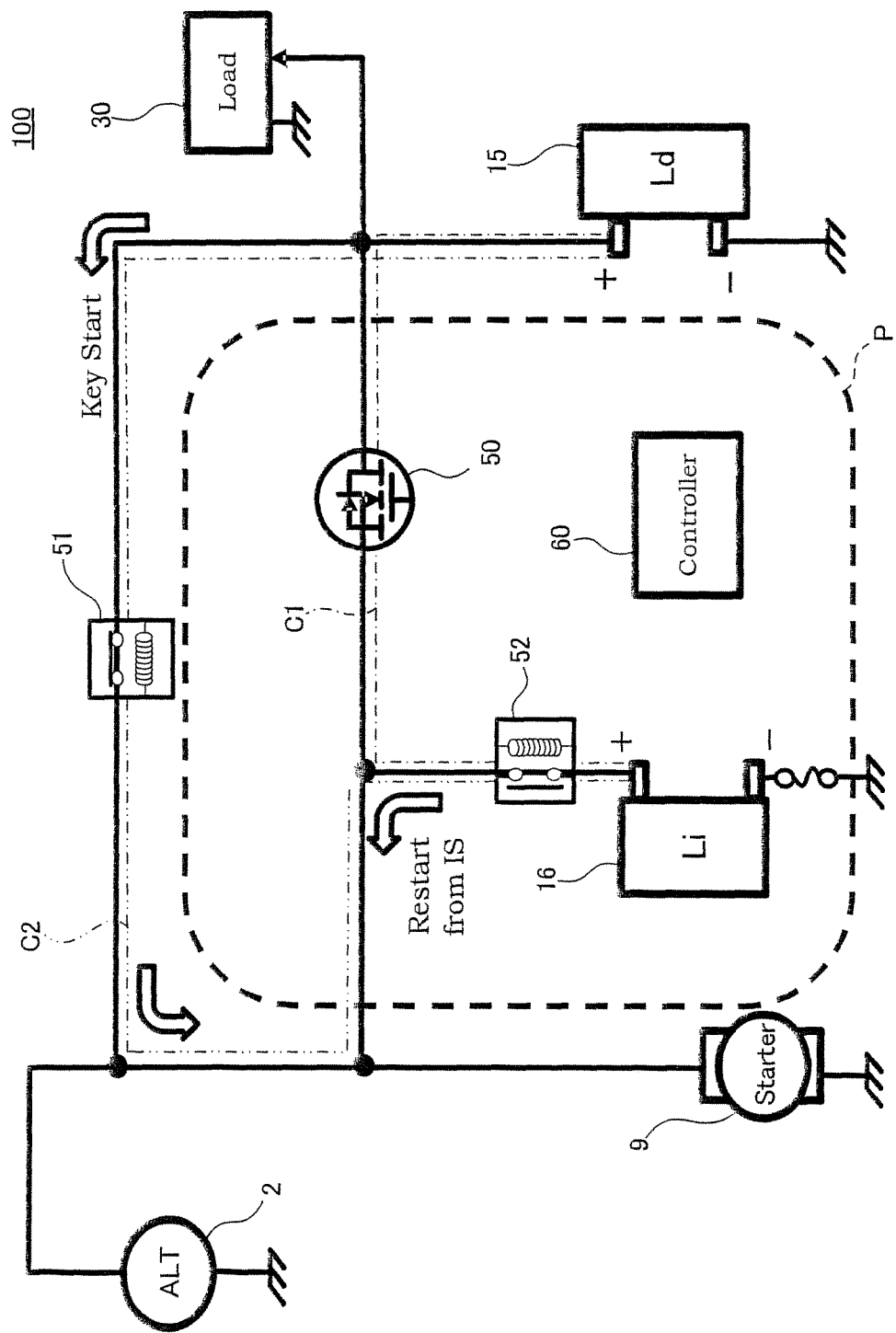
FIG. 2 shows a configuration of a power supply system according to a first embodiment.

FIG. 2 illustrates a first configuration of a power supply system that supplies electric power to the starter 9 and the electric loads 30 (hereinafter also referred to as a type-1 power supply system).

As shown in FIG. 2, in a power supply system 100 according to the present embodiment, the lead-acid battery 15 and the lithium-ion secondary battery 16 are connected in parallel to each other via the two paths C1 and C2. The lead-acid battery path relay 51 is connected to one of the paths, specifically, the path C2. The lead-acid battery path relay 51 serves as a first switch that switches between a conductive state and a non-conductive state of the path C2. The MOSFET 50 is connected to the other path, specifically, the path C1. The MOSFET 50 serves as a second switch that switches between a conductive state and a non-conductive state of the path C1. These lead-acid battery path relay 51 and MOSFET 50 constitute the switching means.

That is, the lead-acid battery path relay 51 is located on the path C2 from the lithium-ion secondary battery 16 to the lead-acid battery 15. On the other hand, the MOSFET 50 is located on the path C1 from the lithium-ion secondary battery 16 to the lead-acid battery 15.

The MOSFET 50 is connected in such a manner that the forward direction of a parasitic diode thereof matches the direction from the lithium-ion secondary battery 16 toward the lead-acid battery 15. In this way, current is prevented from flowing from the lead-acid battery 15 to the lithium-ion secondary battery 16 via the path C1, whether the MOSFET 50 is in an ON state or an OFF state. A relay of a so-called normally closed type, which is in an ON state (a conductive state) when current does not flow through a coil thereof, is used as the lead-acid battery path relay 51. Note that the instantaneous maximum current-carrying capacity of the MOSFET 50 is, for example, 180 A, and the instantaneous maximum current-carrying capacity of the lead-acid battery path relay 51 is, for example, 1200 A.

A lithium-ion secondary battery adjunct relay 52 is connected in series to the lithium-ion secondary battery 16. The lithium-ion secondary battery adjunct relay 52 is constituted by a relay of a so-called normally open type, which is in an OFF state (a non-conductive state) when current does not flow through a coil thereof. Note that the instantaneous maximum current-carrying capacity of the lithium-ion secondary battery adjunct relay 52 is, for example, 800 A.

In the present embodiment, the lithium-ion secondary battery 16, the lithium-ion secondary battery adjunct relay 52, the MOSFET 50, and a battery controller 60 are integrally configured as a lithium battery pack P. The battery controller 60 is programmed to receive, from the ECM 19, a signal related to a discharge instruction or a charge instruction to the starter 9 and all electric loads 30 according to an operating state of the engine 1, and perform control for turning ON/OFF the lithium-ion secondary battery adjunct relay 52 and the MOSFET 50 on the basis of the received signal.

In the type-1 power supply system 100, all electric loads 30 are connected to the lead-acid battery 15 side of the lead-acid battery path relay 51. The starter 9 and the electric generator 2 are connected to the lithium-ion secondary battery 16 side of the lead-acid battery path relay 51.

Below, a description will be given of the following two types of control that are performed in the foregoing power supply system: control for turning ON/OFF the lead-acid battery path relay 51, the lithium-ion secondary battery adjunct relay 52, and the MOSFET 50 in accordance with a condition of engine startup; and control over a lower limit voltage of the electric generator 2 at the time of power generation and over a remaining amount of charge in (the SOC of) the lithium-ion secondary battery 16.

Figure 7:
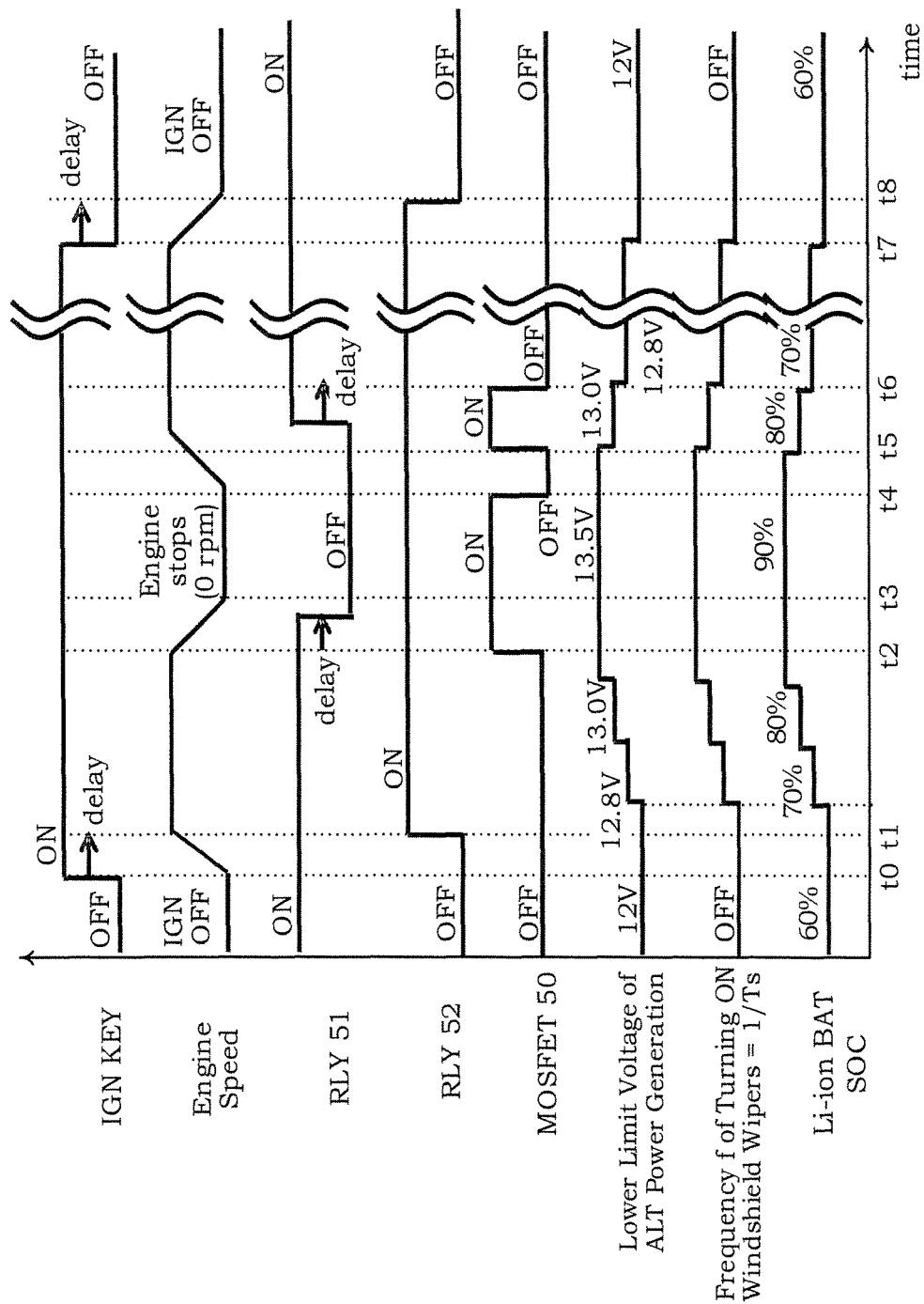
FIG. 7 is a time chart pertaining to execution of control according to the first embodiment.

FIG. 7 is a time chart showing control for tuning ON/OFF the lead-acid battery path relay 51, the lithium-ion secondary battery adjunct relay 52, and the MOSFET 50, the power generation voltage of the electric generator 2, the frequency of actuation of windshield wipers, and the SOC of the lithium-ion secondary battery 16. Specifically, FIG. 7 shows temporal changes in the ON/OFF states of the lead-acid battery path relay 51, the lithium-ion secondary battery adjunct relay 52, and the MOSFET 50, the lower limit voltage of the electric generator 2 at the time of power generation, the frequency of actuation of the windshield wipers, and the SOC of the lithium-ion secondary battery 16, relative to the ON/OFF state of an ignition key (not shown) and the magnitude of engine speed. Herein, the frequency of actuation of the windshield wipers are expressed using a frequency (1/Ts) that is calculated on the basis of a cycle Ts of actuation of the windshield wipers.

Furthermore, hereinafter, the ON states of the lead-acid battery path relay 51, the lithium-ion secondary battery adjunct relay 52, and the MOSFET 50 mean that they are in conductive states, whereas the OFF states of the lead-acid battery path relay 51, the lithium-ion secondary battery adjunct relay 52, and the MOSFET 50 mean that they are in non-conductive states.

First, a description will be given of control for turning ON/OFF the lead-acid battery path relay 51, the lithium-ion secondary battery adjunct relay 52, and the MOSFET 50.

As shown in FIG. 7, for example, during a period from time t0 to time t1 in which the engine 1 is started up for the first time in response to a startup operation (e.g., an ignition key operation and a start button operation) performed by a driver, the lead-acid battery path relay 51 of the normally closed type is in the ON state, the MOSFET 50 is in the OFF state, and the lithium-ion secondary battery adjunct relay 52 of the normally open type is in the OFF state.

Accordingly, electric power is supplied only from the lead-acid battery 15 to the starter 9 via the path C2. At the time of the first startup, the battery controller 60 may place the lithium-ion secondary battery adjunct relay 52 in the ON state so as to supply electric power from two batteries, namely the lead-acid battery 15 and the lithium-ion secondary battery 16 to the starter 9.

During a driving period from time t1 to time t2 that follows the end of the first engine startup, the battery controller 60 switches the lithium-ion secondary battery adjunct relay 52 to the ON state.

Accordingly, the electric power generated by the electric generator 2 can be used to charge not only the lead-acid battery 15, but also the lithium-ion secondary battery 16 via the path C2.

One of the properties of the lithium-ion secondary battery 16 is that it is easily charged using the electric power generated by the electric generator 2 compared with the lead-acid battery 15. Furthermore, one of the properties of the lead-acid battery 15 is that the lead-acid battery 15 in a fully charged state is hardly charged when the charging voltage exceeds 13 V. Therefore, the electric power generated by the electric generator 2 is mainly used to charge the lithium-ion secondary battery 16.

At time t2 at which a deceleration regeneration phase that precedes a transition to the idling stop is started, the battery controller 60 switches the MOSFET 50 to the ON state. Then, the ECM 19 switches the lead-acid battery path relay 51 to the OFF state after a predetermined period $\Delta t$ has elapsed since time $t_2$.

By thus switching the lead-acid battery path relay 51 to the OFF state after the predetermined period has elapsed since the MOSFET 50 was switched to the ON state, the lead-acid battery path relay 51 can be turned OFF in a state where the potential difference between its opposite terminals has been reduced. This can prevent the occurrence of an electric arc when a current flow is blocked.

The aforementioned predetermined period $\Delta t$ can be set as appropriate as a period that can eliminate the potential difference between the opposite terminals of the lead-acid battery path relay 51 to a certain extent.

During the idling stop from time t3 to time t4 that follows the end of the deceleration regeneration phase, the lead-acid battery path relay 51 is maintained in the OFF state, and the battery controller 60 maintains the MOSFET 50 and the lithium-ion secondary battery adjunct relay 52 in the ON states.

Therefore, during the idling stop from time t3 to time t4, the path C1 secures a current flow between the lithium-ion secondary battery 16 and all electric loads 30 despite the OFF state of the lead-acid battery path relay 51. Accordingly, electric power can be supplied to all electric loads 30 from either the lead-acid battery 15 or the lithium-ion secondary battery 16.

When the power generation voltage is excessively high due to, for example, an uncontrollable state of the electric generator 2, in one or more embodiments of the present invention, the lithium-ion secondary battery adjunct relay 52 is placed in the OFF state by the battery controller 60. In this way, application of overvoltage to the lithium-ion secondary battery 16 is prevented.

Furthermore, due to the properties of the lithium-ion secondary battery 16 and the lead-acid battery 15, electric power is supplied to all electric loads 30 mainly from the lithium-ion secondary battery 16. Moreover, because one of the properties of the lithium-ion secondary battery 16 is that it is easily charged using the generated electric power as stated earlier, the voltage of the lithium-ion secondary battery 16 is maintained at or above the voltage of the lead-acid battery 15, except during a later-described automatic restart commencement phase for driving the starter 9 using the electric power from the lithium-ion secondary battery 16.

One of the properties of the lithium-ion secondary battery 16 is that it has a high energy density and a high charge-discharge energy efficiency compared with the lead-acid battery 15. Furthermore, one of the features of the lithium-ion secondary battery 16 is that it is expected to have a long life because dissolution and deposition of electrode materials do not occur along with charge and discharge. On the other hand, the lead-acid battery 15, although low-cost compared with the lithium-ion secondary battery 16 for the same capacity, is subjected to electrode deterioration along with discharge, and hence inferior to the lithium-ion secondary battery 16 in terms of durability against repetitive charge and discharge.

In view of this, in the present embodiment, the battery controller 60 switches the MOSFET 50 to the OFF state in the restart commencement phase (from time t4 to time t5) that immediately precedes the end of the idling stop.

As both of the lead-acid battery path relay 51 and the MOSFET 50 are subsequently in the OFF state, a current flow between the starter 9 side (the lithium-ion secondary battery 16) and the all electric loads 30 side (the lead-acid battery 15) is completely blocked. This prevents an instantaneous drop in the voltage of all electric loads 30 caused by high current flowing through a motor of the starter 9. Meanwhile, as the lithium-ion secondary battery adjunct relay 52 is maintained in the ON state, a current flow between the lithium-ion secondary battery 16 and the starter 9 is secured, and the starter 9 can be started up by the discharge of the lithium-ion secondary battery 16.

A predetermined resistor and a bypass relay that are connected in parallel to each other may be interposed between the lithium-ion secondary battery 16 and the starter 9. In this configuration, a current spike can be significantly reduced at the time of startup of the starter 9 by switching the bypass relay from the non-conductive state to the conductive state after approximately 100-150 ms have elapsed since the starter 9 was driven by the electric power supplied from the lithium-ion secondary battery 16. As a result, a startup performance can be secured. In this case, when a predetermined period has elapsed since complete engine combustion, control for returning to a normal running state is performed.

Then, after the end of the restart commencement phase, a restart initial phase (from time t5 to time t6) begins. At time t5 at which the restart initial phase begins, the battery controller 60 switches the MOSFET 50 to the ON state. Meanwhile, the ECM 19 switches the lead-acid battery path relay 51 to the ON state after a predetermined period (Δt' in the figure) the MOSFET 50 is switched to the ON state.

In this way, the MOSFET 50 is switched to the ON state first, and then the lead-acid battery path relay 51 is switched to the ON state after a delay of a predetermined period Δt. As a result, when the restart initial phase is started (time t5), the MOSFET 50 with higher response speed than the lead-acid battery path relay 51 places the path C1 in the conductive state without delay, thereby enabling both of the lead-acid battery 15 and the lithium-ion secondary battery 16 to discharge current to all electric loads 30. Furthermore, the MOSFET 50 in the ON state reduces the potential difference between the opposite terminals of the lead-acid battery path relay 51. Thus, by switching the lead-acid battery path relay 51 to the ON state in this state, the occurrence of inrush current is prevented.

While the engine is in operation (from time t6 to time t7) after the end of the restart initial phase, the battery controller 60 switches the MOSFET 50 to the OFF state.

Thereafter, at time t7, an engine stop phase for placing the ignition key in the OFF state is started. A period from time t7 to time t8 is an engine stop commencement phase that lasts until the engine is stopped. As is apparent from the figure, in the present embodiment, the lithium-ion secondary battery adjunct relay 52 of the normally open type is switched to the OFF state at time t8 at which the engine rotation speed reaches zero. Meanwhile, the lead-acid battery path relay 51 of the normally closed type remains in the ON state. Therefore, at the next initial engine startup (time t0), the initial startup can be performed with the lead-acid battery 15 and the starter 9 in the conductive states.

A description is now given of the operational effects of the foregoing control for turning ON/OFF the lead-acid battery path relay 51, the lithium-ion secondary battery adjunct relay 52, and the MOSFET 50.

In the power supply system 100, should the electric power of the lead-acid battery 15 be used in commencing the automatic restart of the engine 1 (at time t4), the lead-acid battery 15, which has lower durability against repetitive charge and discharge than the lithium-ion secondary battery 16 as stated earlier, suffers progressive deterioration each time the idling stop is performed. As a result, a replacement cycle of the lead-acid battery 15 is shortened.

In contrast, in the present embodiment, in the phase for commencing the automatic restart of the engine 1, the lead-acid battery path relay 51 and the MOSFET 50 are in the OFF states, that is, the path for supplying electric power from the lead-acid battery 15 to the starter 9 is blocked. Thus, only the electric power of the lithium-ion secondary battery 16 is used in the automatic restart. This can extend the replacement cycle of the lead-acid battery 15.

In FIG. 2, both of the MOSFET 50 and the lead-acid battery path relay 51 are used to switch between a state where a current flow is allowed between the lead-acid battery 15 and the starter 9 and a state where a current flow is blocked between the lead-acid battery 15 and the starter 9. However, only one of the MOSFET 50 and the lead-acid battery path relay 51, or another switch, may be used to allow or block a current flow between the lead-acid battery 15 and the starter 9.

It should be noted that, if only the MOSFET 50 is used to allow or block a current flow between the lead-acid battery 15 and the starter 9, the MOSFET 50 is frequently turned ON/OFF. This brings about adverse effects attributed to heat generation. If only the lead-acid battery path relay 51 is used to allow or block a current flow between the lead-acid battery 15 and the starter 9, due to the poor responsiveness of a relay switch, a long time is required before the automatic restart in a case where control for placing the lead-acid battery path relay 51 in the OFF state is performed after the conditions for the automatic restart are satisfied. On the other hand, in a case where the lead-acid battery path relay 51 is placed in the OFF state during the idling stop, electric power cannot be supplied from the lithium-ion secondary battery 16 during the idling stop because the MOSFET 50 is in the OFF state as well.

Moreover, in order to further improve the products' safety and durability, one or more embodiments of the present invention includes a redundant circuit that includes both of the MOSFET 50 and the lead-acid battery path relay 51, rather than using only one of the MOSFET 50 and the lead-acid battery path relay 51 to allow or block a current flow between the lead-acid battery 15 and the starter 9.

In the present embodiment, the lead-acid battery path relay 51 is placed in the OFF state and the MOSFET 50 is placed in the ON state during the idling stop (from time t3 to time t4), and the MOSFET 50 with excellent responsiveness is switched from the ON state to the OFF state upon commencement of the automatic restart (time t4). In this way, the path for supplying electric power from the lead-acid battery 15 to the starter 9 is reliably blocked, and the automatic restart can be promptly performed without causing a voltage drop of all electric loads 30.

Especially in the present embodiment, the voltage of the lithium-ion secondary battery 16 is equal to or higher than the voltage of the lead-acid battery 15, except during the restart commencement phase (from time t4 to time t5). In other words, only during the restart commencement phase (from time t4 to time t5), there is a possibility that the voltage of the lead-acid battery 15 exceeds the voltage of the lithium-ion secondary battery 16, triggering a current flow from the lead-acid battery 15 side to the lithium-ion secondary battery 16 side. Therefore, the current flow from the lead-acid battery 15 side to the lithium-ion secondary battery 16 side can be prevented by placing the lead-acid battery path relay 51 and the MOSFET 50 in the OFF states during the restart commencement phase (from time t4 to time t5).

In this way, the current flow from the lead-acid battery 15 side to the lithium-ion secondary battery 16 side can be prevented without providing a MOSFET including a parasitic diode whose forward direction is opposite to the forward direction of the parasitic diode of the MOSFET 50. Accordingly, the number of MOSFETs to be used can be reduced, thereby realizing a cost reduction.

In the power supply system 100 according to the present embodiment, a portion where the lead-acid battery 15 and all electric loads 30 are connected is configured in a manner similar to an ordinary electric circuit for a vehicle including only one battery.

Furthermore, in the present embodiment, only the lithium-ion secondary battery 16 is used in the automatic restart as stated earlier. The lead-acid battery 15 is not used in the automatic restart. Thus, in a case where the power supply system 100 according to the present embodiment is installed in a vehicle with the idling stop function, the capacity of the lead-acid battery 15 need not be increased compared with that in a vehicle without the idling stop function, and can be the same as in the vehicle without the idling stop function. Accordingly, the cost of installing an idling stop system in a vehicle can be reduced.

According to the present embodiment, even if electric power cannot be supplied from the lithium-ion secondary battery 16 to the starter 9 due to, for example, disconnection of a negative terminal of the lithium-ion secondary battery 16, the automatic restart can be performed as electric power can be supplied from the lead-acid battery 15 to the starter 9 by closing the lead-acid battery path relay 51. That is, redundancy can be realized in a system related to the automatic restart.

The present embodiment adopts a configuration in which the lithium-ion secondary battery pack P includes the lithium-ion secondary battery 16, the MOSFET 50, the lithium-ion secondary battery adjunct relay 52, and the battery controller 60, and the lead-acid battery path relay 51 is arranged outside the lithium-ion secondary battery pack P.

However, this configuration can be changed in any manner as long as the mechanisms of the circuits of the power supply system 100 are not changed. For example, the lead-acid battery path relay 51 may be arranged in the lithium battery pack P while being connected in parallel to the MOSFET 50. Also, the battery controller 60 may be disposed outside the lithium-ion secondary battery pack P.

A description is now given of control over the lower limit voltage of the electric generator 2 at the time of power generation and over the SOC of the lithium-ion secondary battery 16.

As stated earlier, electric power is supplied to all electric loads 30 from the lithium-ion secondary battery 16 and the lead-acid battery 15. In order to maintain the lithium-ion secondary battery 16 and the lead-acid battery 15 in a state where the voltage required by all electric loads 30 can be provided, a lower limit is set for the voltage of the electric generator 2 at the time of power generation (hereinafter also referred to as the lower limit voltage). The lower limit voltage is set at, for example, 12 V in a normal state. In this context, "normal" means a state where electronic components (e.g., the windshield wipers, a fuel pump, and a radiator fan) that require higher voltage to guarantee actuation thereof than other components have not been actuated, or a state where the voltage required by all electric loads 30 is relatively low even though such electronic components have been actuated. For example, running at low or middle speed when it just started to rain or in light rain is considered the normal state. On the other hand, for example, in a state where the windshield wipers need to be actuated at high speed in heavy rain, or in a state where the windshield wipers need to be actuated at high speed against wind pressure while running at high speed, the required voltage is higher than normal, that is, higher voltage than normal is needed.

The SOC of the lithium-ion secondary battery 16 is controlled so as not to fall below a lower limit SOC. The lower limit SOC is set in consideration of power supply to all electric loads 30 and the recovery efficiency of regenerated electric power at the time of vehicle deceleration, and is set at, for example, approximately 60% in the normal state.

In a state where higher voltage than normal is needed, if the lower limit voltage of the electric generator 2 at the time of power generation is the same as in the normal state, it will be difficult to stably supply electric power to all electric loads 30. In view of this, the lower limit voltage needs to be increased. However, if the lower limit voltage is increased after the need for higher voltage than normal has arisen, the generated electric power will be absorbed by the secondary batteries, especially by the lithium-ion secondary battery 16, and thus the voltage supplied to all electric loads 30 does not immediately increase.

In view of this, in the present embodiment, the battery controller 60 increases the SOC of the lithium-ion secondary battery 16 in advance when the need for higher voltage than normal is predicted. Increasing the SOC of the lithium-ion secondary battery 16 in advance will reduce the electric power absorbed by the lithium-ion secondary battery 16 when the power generation voltage of the electric generator 2 has been increased. In this way, the increase in the voltage required by all electric loads 30 can be promptly dealt with.

The need for higher voltage than normal is predicted on the basis of, for example, the frequency of driving of the windshield wipers. This is because a state where higher voltage than normal is needed can be determined to be approaching as the frequency of driving of the windshield wipers increases.

The specifics of this control will now be described.

Figure 3:
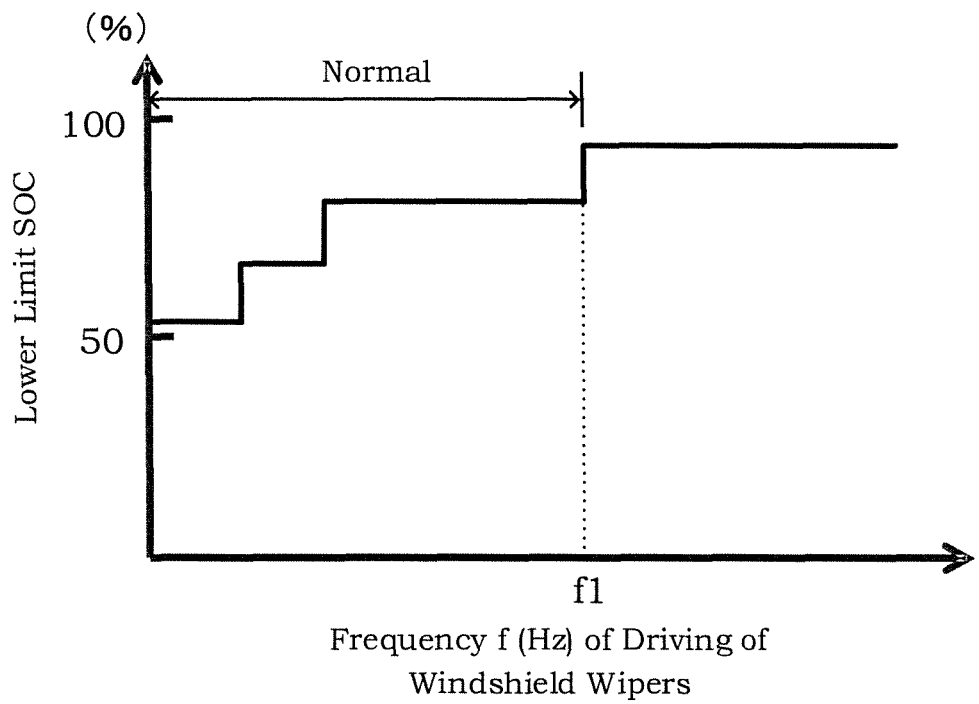
FIG. 3 shows an example of a table that is used to set a lower limit of the SOC of a lithium-ion battery.

FIG. 3 is a table showing a relationship between the frequency f of driving of the windshield wipers and the lower limit SOC. Provided that the cycle of actuation of the windshield wipers is Ts (seconds), the frequency f of driving is expressed as $f=1/Ts$.

In the table of FIG. 3, the lower limit SOC increases as the frequency of driving of the windshield wipers increases in the normal state ($f<f1$). The purpose of increasing the lower limit SOC is to increase the SOC of the lithium-ion secondary battery 16.

With reference to FIG. 7, a description is now given of control over the lower limit SOC in accordance with the table of FIG. 3. Between time t1 and time t2, the frequency of driving of the windshield wipers gradually increases, thereby making a transition from the normal state to a state where higher voltage than normal is needed. As the frequency of driving of the windshield wipers increases, the lower limit SOC of the lithium-ion secondary battery 16 increases as stated earlier. Accordingly, the lower limit voltage of the electric generator 2 increases, and the SOC of the lithium-ion secondary battery 16 increases.

In this way, once the windshield wipers have been actuated, the battery controller 60 increases the SOC of the lithium-ion secondary battery 16 in advance during the normal state. As a result, upon entering into a state where higher voltage than normal is needed, the need can be promptly dealt with by increasing the power generation voltage of the electric generator 2. Experimental data has led to the finding that, even when a sudden squall and the like have given rise to the need for higher voltage than normal, maintaining the SOC of the lithium-ion secondary battery 16 at approximately 70% can achieve the voltage required by the windshield wipers (e.g., approximately 14 V) within a few seconds after increasing a designated value of the power generation voltage of the electric generator 2.

Furthermore, as the SOC of the lithium-ion secondary battery 16 gradually increases, regenerated electric power can be absorbed by a secured amount at the time of deceleration when, for example, it just started to rain.

Figure 8:
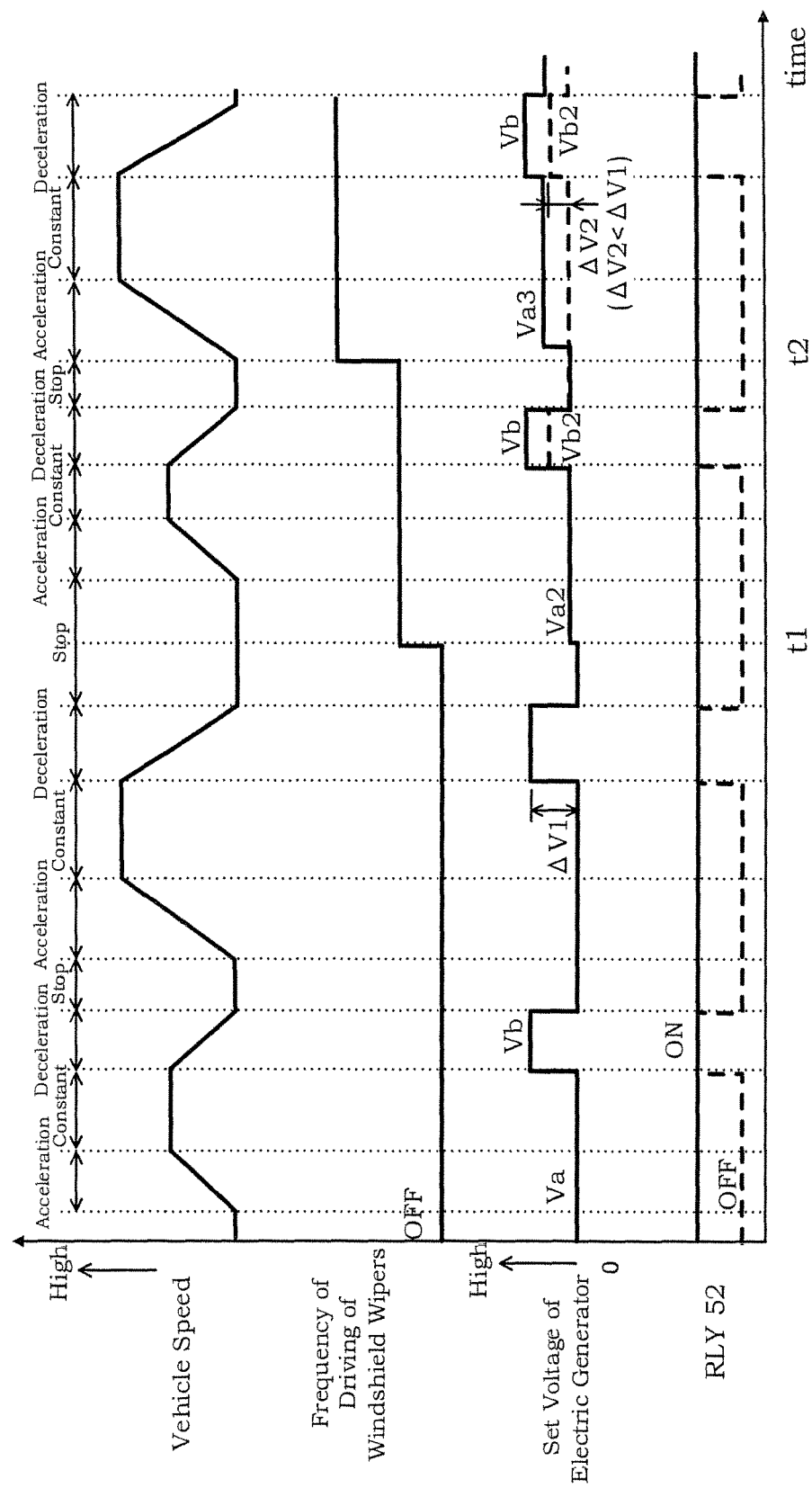
FIG. 8 is a time chart illustrating the operational effects of control according to the first embodiment.

Furthermore, as the upper limit of the power generation voltage of the electric generator 2 remains the same as in the normal state in the present embodiment, performing the control according to the present embodiment does not reduce an amount of electric power regenerated at the time of deceleration. FIG. 8 is a timing chart showing a comparison between a case where the control according to the present embodiment has been performed (solid lines in the figure) and a case where the control described in the aforementioned JP 54944988 has been performed (dash lines in the figure). As shown in FIG. 8, with the control according to JP 5494498B, when the frequency of driving of the windshield wipers increases, a lower limit of a set voltage of the electric generator 2 is increased to Va2, and an upper limit of the set voltage of the electric generator 2 is reduced to Vb2. In contrast, in the present embodiment, an upper limit of the set voltage remains at Vb. Therefore, more electric power can be regenerated in the present embodiment.

Furthermore, with the control according to JP 5494498B, the regeneration of electric power is started by turning ON the lithium-ion secondary battery adjunct relay 52 at the start of deceleration, and this relay 52 is turned OFF when the regeneration ends. In contrast, in the present embodiment, this relay 52 remains in the ON state until the ignition is turned OFF as stated earlier. That is, in the present embodiment, as charge and discharge can be performed in a state where the lithium-ion secondary battery 16 is always connected to the electric generator 2 and all electric loads 30, the capacity of the lithium-ion secondary battery 16 can be used efficiently.

Figure 4:
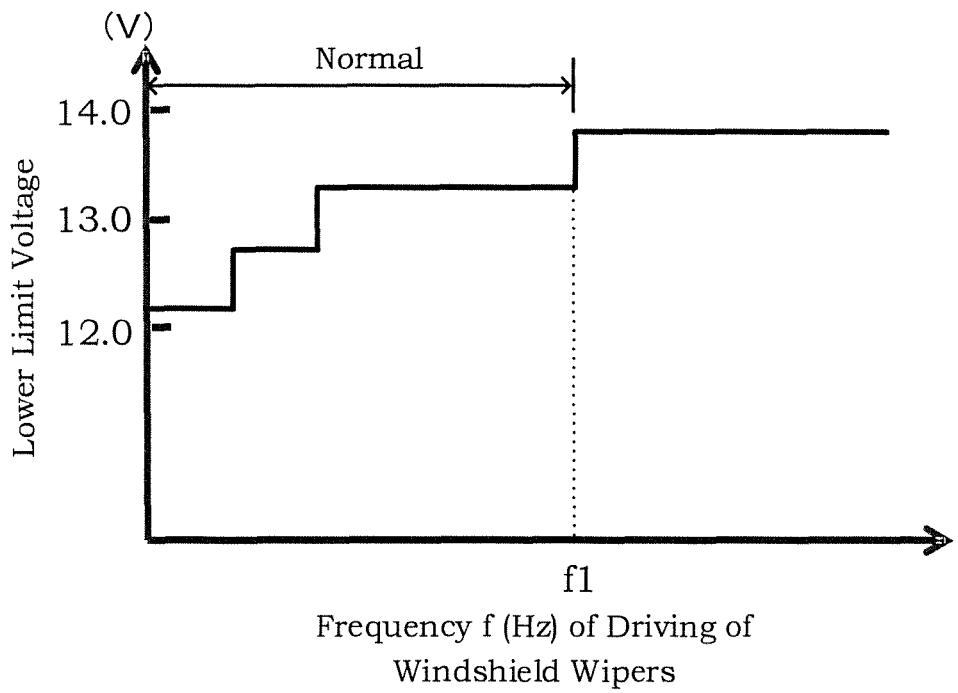
FIG. 4 shows an example of a table that is used to set a lower limit of the power generation voltage of an electric generator.

FIG. 4 is a table showing a relationship between the frequency f of driving of the windshield wipers and the lower limit voltage of the electric generator 2 at the time of power generation. In FIG. 4, the lower limit voltage increases as the frequency of driving of the windshield wipers increases. The increase in the lower limit voltage results in an increase in the SOC of the lithium-ion secondary battery 16. Accordingly, the operational effects that are similar to the aforementioned operational effects can be achieved. Therefore, the table of FIG. 4 may be used instead of the table of FIG. 3.

Incidentally, the radiator fan is one of the electric loads that requires higher voltage to guarantee actuation thereof than other electric loads. The speed at which the radiator fan is required to rotate increases as a cooling water temperature increases. In view of this, the battery controller 60 may predict whether higher voltage than normal is needed on the basis of the cooling water temperature.

Figure 5:
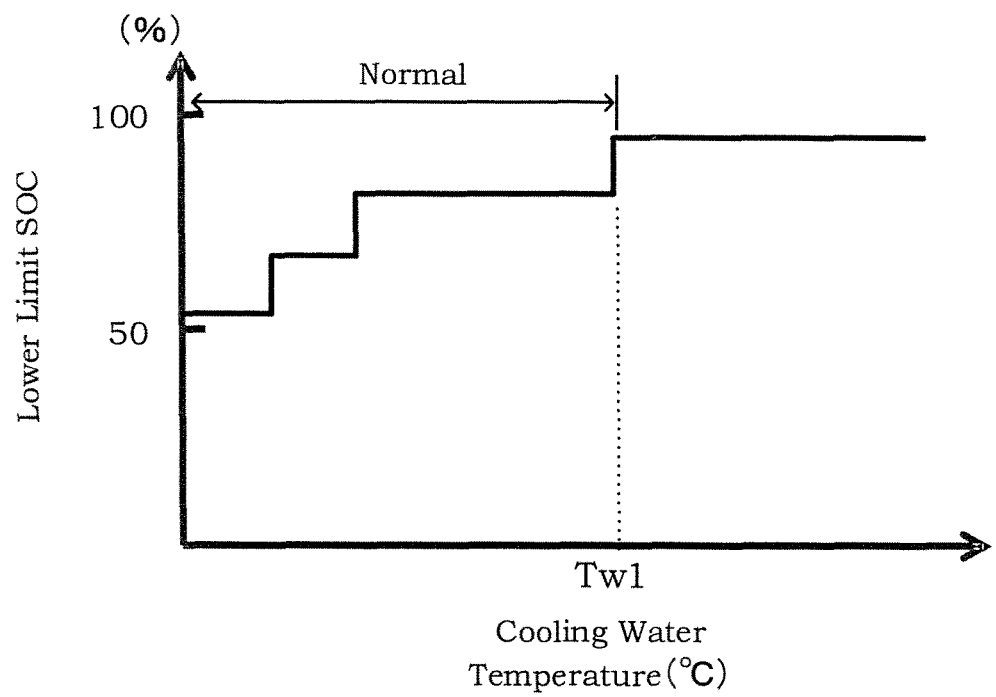
FIG. 5 shows another example of a table that is used to set a lower limit of the SOC of the lithium-ion battery.

FIG. 5 is a table showing a relationship between the cooling water temperature and the lower limit SOC of the lithium-ion secondary battery 16. In FIG. 5, the lower limit SOC increases as the cooling water temperature increases. When control is performed using this table, the operational effects that are similar to the operational effects achieved by control using the tables of FIGS. 3 and 4 can be achieved.

Note that a Pd pressure of an air conditioning system (a high-pressure side refrigerant pressure) or an evaporator temperature may be used instead of the cooling water temperature. This is because the radiator fan is required to rotate at high speed also when the air conditioning system is required to perform a more intense cooling operation, and the extent of the cooling operation required for the air conditioning system can be determined on the basis of the Pd pressure or the evaporator temperature. Alternatively, a vertical axis of FIG. 5 may represent the lower limit voltage of the electric generator 2.

A driven state of the fuel pump can be used instead of a driven state of the windshield wipers or the radiator fan. The voltage required by the fuel pump increases as the fuel injection amount increases. In view of this, the operational effects that are similar to the aforementioned operational effects can be achieved by detecting a frequency at which the accelerator position (accelerator opening degree) indicates a significantly depressed state (e.g., approximately 70% of a fully depressed state), and increasing the lower limit SOC as this frequency increases.

Figure 6:
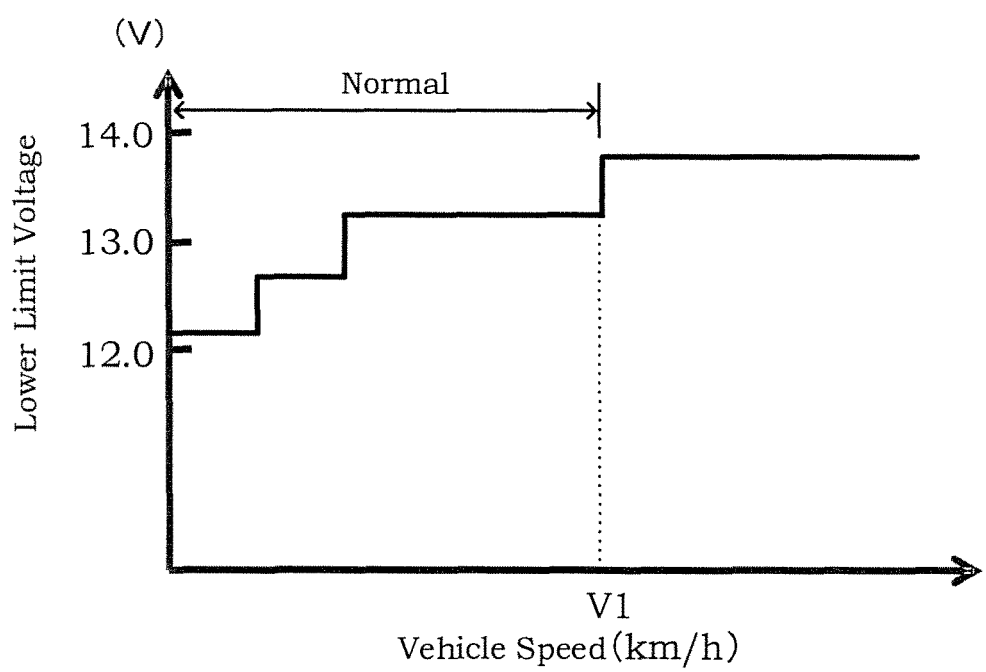
FIG. 6 shows another example of a table that is used to set a lower limit of the power generation voltage of the electric generator.

FIG. 6 is a table used in control that is intended to guarantee the wiping performance of the windshield wipers while running at high speed. In FIG. 6, a vehicle speed of V1 or higher is considered a high speed.

The higher the vehicle speed, the higher the wind pressure, and the higher the voltage required by the windshield wipers. For safety reasons, it is desirable that the windshield wipers can promptly start a high-speed operation, even in a sudden encounter with heavy rain while running at high speed. In view of this, as a preparation for sudden rain while running at high speed, the battery controller 60 performs control for increasing the lower limit voltage of the electric generator 2 as the vehicle speed increases on the basis of the table of FIG. 6. In this way, the lower limit voltage is gradually increased similarly to the cases of FIGS. 3 to 5. As a result, the wiping performance of the windshield wipers can be guaranteed while securing an amount of regeneration of electric power at the time of deceleration.

Although the lower limit SOC and the lower limit voltage are increased in a stepwise manner in FIGS. 3 to 6, they may be increased continuously.

One or more embodiments of the present invention may achieve one or more of the below operational effects.

The battery controller (power supply system control device) 60 according to the present embodiment is programmed to control the power supply system that includes: the electric generator 2; the lead-acid battery (first electricity storage means) 15 capable of being charged with and discharging the electric power generated by the electric generator 2; the lithium-ion secondary battery (second electricity storage means) 16 capable of being charged with and discharging the generated electric power; the two paths C1 and C2 connecting between the lead-acid battery 15 and the lithium-ion secondary battery 16; the switching means (Inter-BAT RLY in FIG. 1) 17 including the lead-acid battery path relay (first switch) 51 that switches between the conductive state and the non-conductive state of one path C2 and the MOSFET (second switch) 50 that switches between the conductive state and the non-conductive state of the other path C1; and all electric loads (electric loads of the vehicle) 30 that are connected to the lead-acid battery 15 side of the switching means 17. When it is determined that actuation of the electric loads 30 has a possibility of requiring higher voltage than normal, the SOC of (the remaining amount of charge in) the lithium-ion secondary battery 16 is increased in advance.

In this way, supplied voltage can be promptly increased in response to a sudden increase in the frequency of actuation of a vehicular electric component that requires high voltage to be actuated, that is, in response to a sudden increase in the required voltage.

In one or more embodiments of the present invention, the battery controller 60 determines that the higher the frequency of actuation of a vehicular electric component that requires high voltage to be actuated, the higher the possibility that higher voltage than normal is needed. In this way, an increase in the required voltage can be predicted with high precision.

In one or more embodiments of the present invention, the battery controller 60 gradually increases the remaining amount of charge in the lithium-ion secondary battery 16 along with an increase in the frequency of actuation of a vehicular electric component that requires high voltage to be actuated. In this way, regeneration of electric power at the time of deceleration can be secured and the actual fuel economy can be improved while stably supplying voltage, even in a sudden encounter with rain while running at high speed, for example.

In one or more embodiments of the present invention, the battery controller 60 either increases the lower limit of the remaining amount of charge in the lithium-ion secondary battery 16, or increases the minimum power generation voltage of the electric generator 2, so as to increase the SOC of the lithium-ion secondary battery 16. The SOC of the lithium-ion secondary battery 16 can be increased either way.

Note that the control according to one or more embodiments of the present invention is not limited to being applied to the type-1 power supply system 100 shown in FIG. 2, and can be applied to a power supply system with a second configuration (hereinafter also referred to as a type-2 power supply system) 100' shown in FIG. 9.

Figure 9:
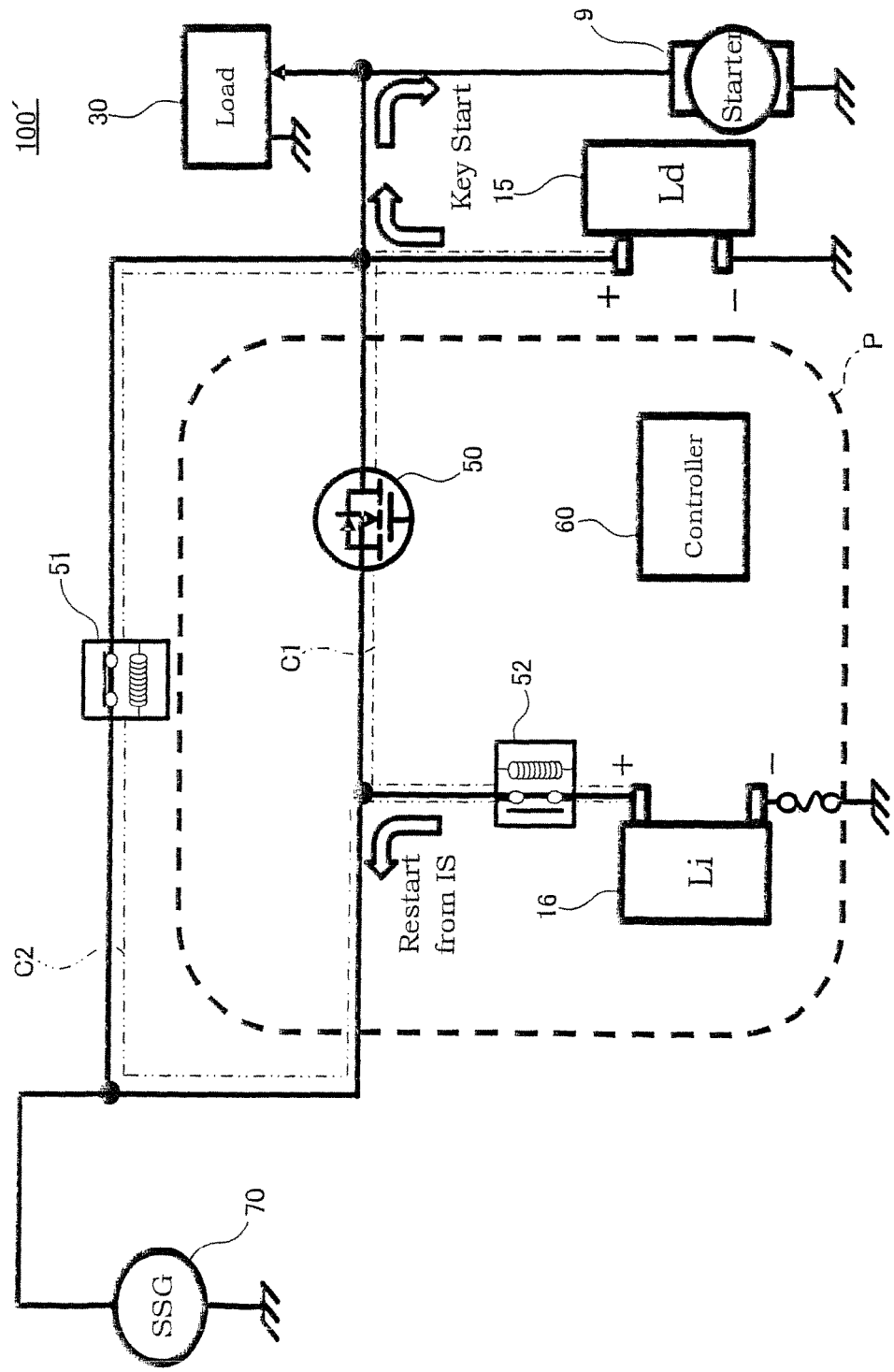
FIG. 9 shows a configuration of a power supply system according to another example of the first embodiment.

FIG. 9 illustrates the type-2 power supply system 100'. Note that the elements similar to the elements shown in FIG. 2 are given the same reference signs thereas.

The type-2 power supply system 100' differs from the type-1 power supply system 100 shown in FIG. 2 in that an electric motor 70 is used instead of the electric generator 2, and in that the starter 9 is connected to the lead-acid battery 15 side of the lead-acid battery path relay 51. The electric motor 70 includes a pulley that is equivalent to the electric generator pulley 6, and this pulley and the crank pulley 5 are mechanically joined to each other via a belt and the like.

The electric motor 70 includes an inverter, and has a motor function that is driven by the electric power supplied from the lithium-ion secondary battery 16, as well as a power generation function that generates electric power while being driven by a driving force of the engine 1. In using the power generation function of the electric motor 70, the power generation voltage can be variably controlled.

Switching between the motor function and the power generation function is performed by the ECM 19. The motor function is used mainly in the phase for commencing the automatic restart from the idling stop. That is, in the present type-2 power supply system 100', the electric motor 70 serves as engine restart means. Note that the starter 9 is used only at the time of the first startup (at the time of startup that is not the automatic restart). The specifications of this starter 9 can be the same as in a vehicle without the idling stop function.

Furthermore, in the present type-2 power supply system 100', the lead-acid battery 15 and the starter 9 are located on the same side relative to the lead-acid battery path relay 51. Therefore, when supplying electric power from the lead-acid battery 15 to the starter 9 at the time of the first startup of the engine 1, current does not flow through the lead-acid battery path relay 51.

That is, in setting the instantaneous maximum current-carrying capacity of the lead-acid battery path relay 51, there is no need to take into consideration a flow of high current for driving the starter 9 at the time of the first startup of the engine 1. Accordingly, the current-carrying capacity of the lead-acid battery path relay 51 can be made smaller than the current-carrying capacity of the lead-acid battery path relay 51 used in the type-1 power supply system 100. This can reduce the cost of configuring the lead-acid battery path relay 51.

Second Embodiment

Figure 10:
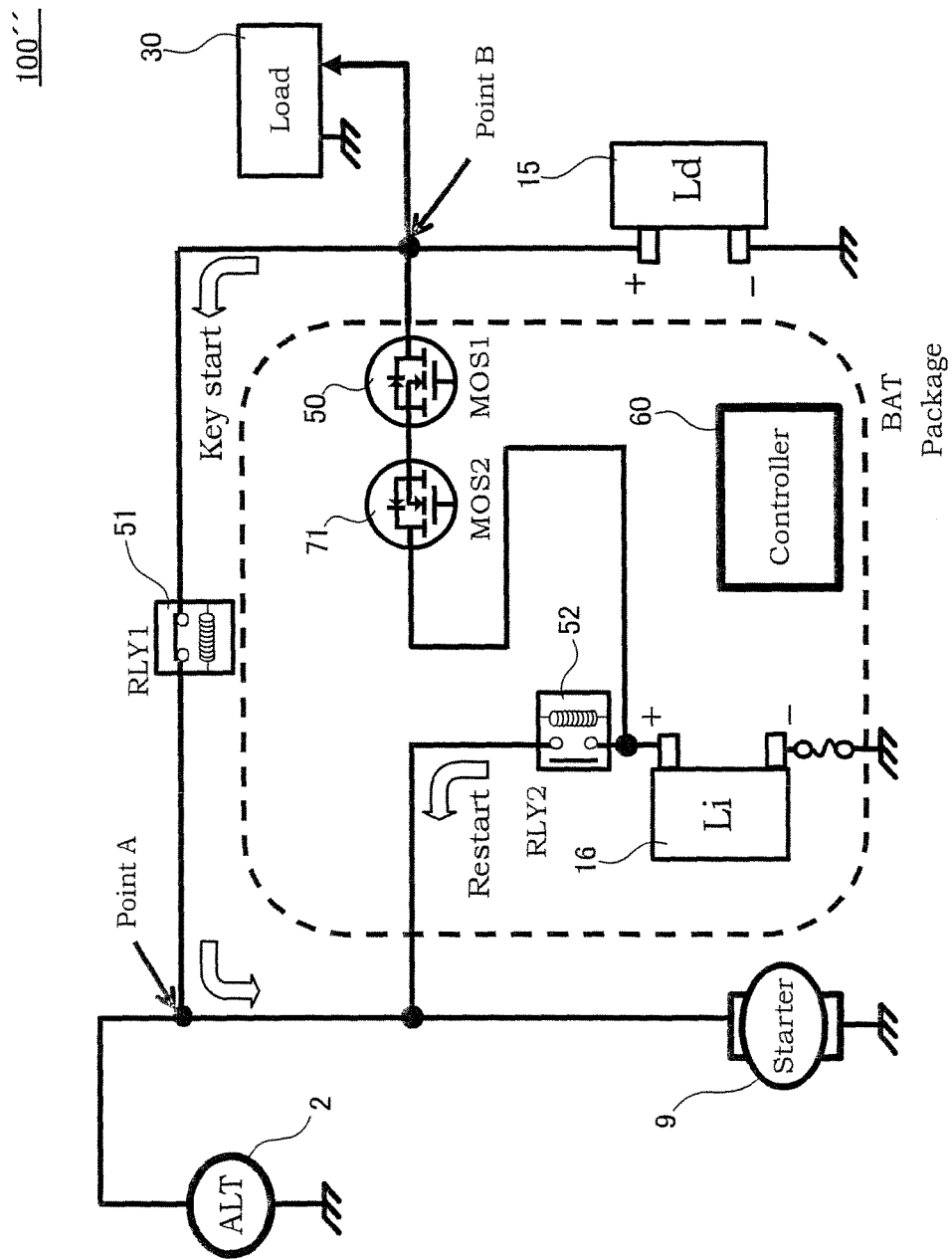
FIG. 10 shows a configuration of a power supply system according to a second embodiment.

FIG. 10 illustrates a power supply system with a third configuration (hereinafter also referred to as a type-3 power supply system) 100". Note that the elements similar to the elements shown in FIG. 2 are given the same reference signs thereas.

FIG. 10 differs from FIG. 2 in that a MOSFET 71, which includes a parasitic diode whose forward direction is opposite to the forward direction of the parasitic diode of the MOSFET 50, is connected in series to the MOSFET 50, and in that the lithium-ion secondary battery adjunct relay 52 is interposed between the lithium-ion secondary battery 16 and the starter 9, rather than between the MOSFET 71 and the lithium-ion secondary battery 16.

With the foregoing configuration, should the lithium-ion secondary battery adjunct relay 52 become no longer actuated while remaining in an open state, electric power can be supplied from the lithium-ion secondary battery 16 to all electric loads 30 by controlling the MOSFET 50 and the MOSFET 71.

Figure 11:
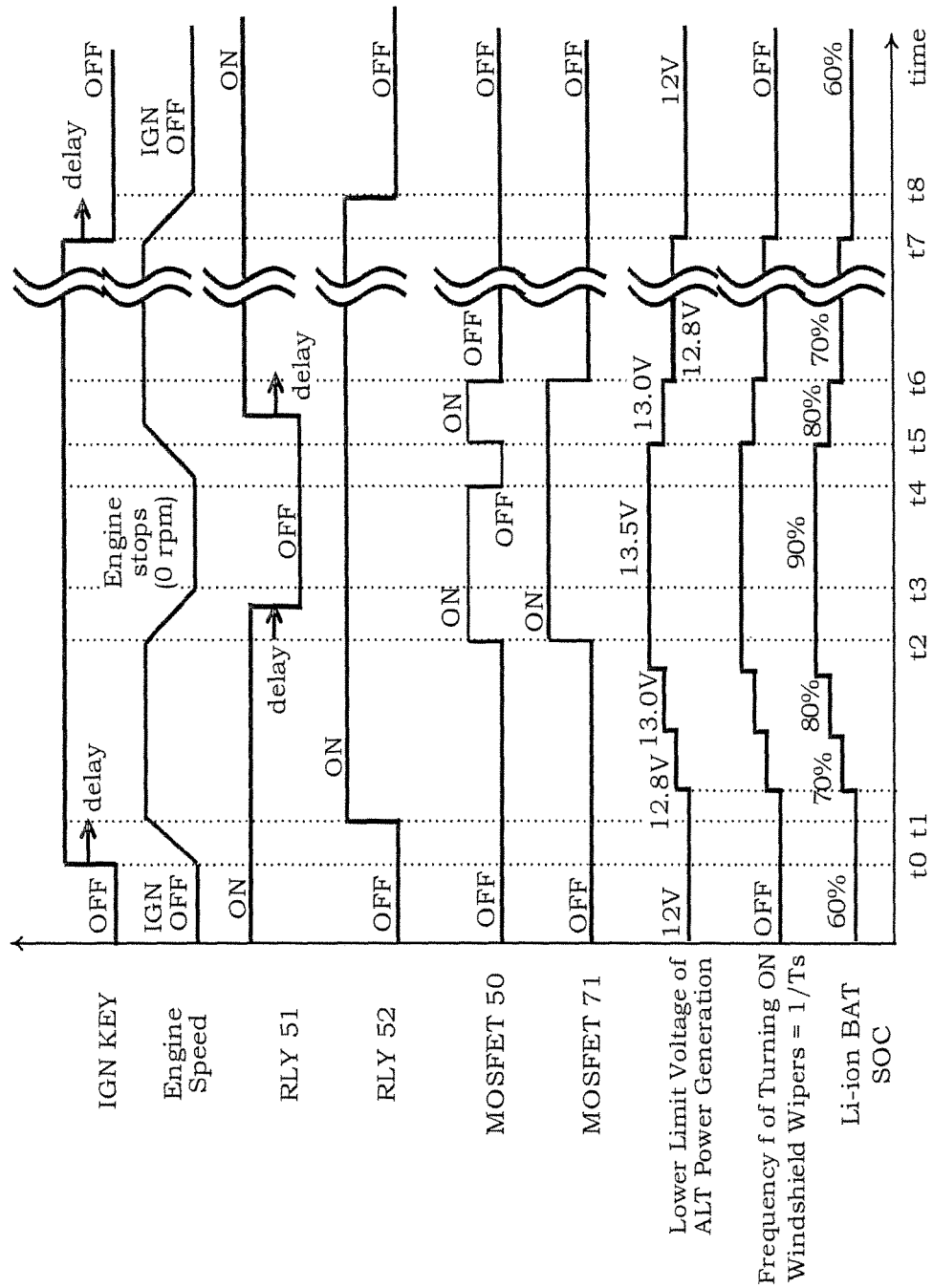
FIG. 11 is a time chart pertaining to execution of control according to the second embodiment.

FIG. 11 is a time chart showing control for turning ON/OFF the lead-acid battery path relay 51, the lithium-ion secondary battery adjunct relay 52, the MOSFET 50, and the MOSFET 71, the power generation voltage of the electric generator 2, the frequency of actuation of the windshield wipers, and the SOC of the lithium-ion secondary battery 16 in the type-3 power supply system 100". FIG. 11 is similar to FIG. 7, except for the addition of control for turning ON/OFF the MOSFET 71.

Similarly to the MOSFET 50, the MOSFET 71 is in the OFF state between time t0 and time t1.

At time t2 at which the deceleration regeneration phase is started, the battery controller 60 switches the MOSFET 50 and the MOSFET 71 to the ON states. As a result, the lithium-ion secondary battery 16 and all electric loads 30 are placed in the conductive states.

The battery controller 60 switches the MOSFET 50 to the OFF state and leaves the MOSFET 71 in the ON state in the restart commencement phase (from time t4 to time t5) that immediately precedes the end of the idling stop. This is because it is sufficient to place the MOSFET 50 in the OFF state to block electric connection between the lithium-ion secondary battery 16 and all electric loads 30.

That is, the MOSFET 71 is maintained in the ON state from time t2 at which the deceleration is started to time t6 at which the restart initial phase ends.

In the foregoing type-3 power supply system 100″ also, the need for high voltage is predicted on the basis of the frequency of actuation of the windshield wipers, and the SOC of the lithium-ion secondary battery 16 is gradually increased, similarly to the first embodiment.

Accordingly, one or more of the operational effects that are similar to the operational effects achieved in the first embodiment may be achieved. Similarly to the first embodiment, the SOC of the lithium-ion secondary battery 16 may be increased by either increasing the lower limit SOC of the lithium-ion secondary battery 16, or increasing the lower limit voltage of the electric generator 2. It goes without saying that the actuation states of the radiator fan and the fuel pump may be used instead of the frequency of driving of the windshield wipers, or control based on a vehicle speed may be performed, similarly to the first embodiment.

Figure 12:
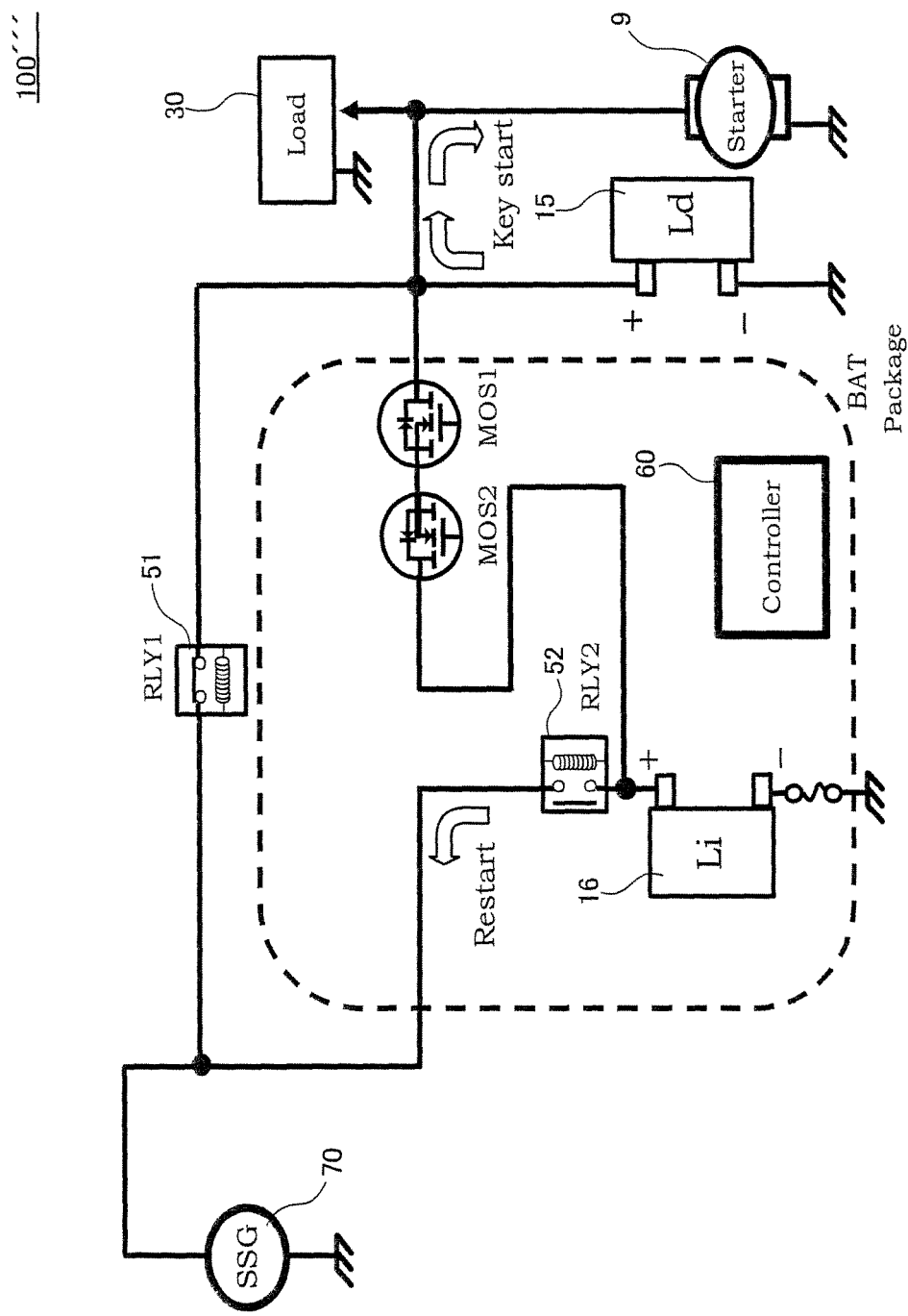
FIG. 12 shows a configuration of a power supply system according to another example of the second embodiment.

Furthermore, the present embodiment can also be applied to a power supply system with a fourth configuration (hereinafter also referred to as a type-4 power supply system) 100‴ shown in FIG. 12. The relationship between the type-3 power supply system 100″ and the type-4 power supply system 100‴ is similar to the relationship between the type-1 power supply system 100 and the type-2 power supply system 100′. That is, the type-4 power supply system 100‴ differs in that the electric motor 70 is used instead of the electric generator 2, and that the starter 9 is connected to the lead-acid battery 15 side of the lead-acid battery path relay 51.

The above-described embodiments of the present invention merely illustrate a part of example applications of the present invention, and the specific configurations of the above-described embodiments are not intended to limit a technical scope of the present invention. For example, the first electricity storage means is not limited to the lead-acid battery 15, and may be, for example, a lead-free secondary battery, such as a nickel-hydrogen battery. Furthermore, the mechanical relays used in the embodiments may be replaced with switching elements with semiconductors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A power supply system control device for controlling a power supply system, the power supply system comprising:
    an electric generator;
    a first electricity storage configured to be charged with and to discharge electric power generated by the electric generator;
    a second electricity storage configured to be charged with and to discharge the generated electric power;
    two paths connecting between the first electricity storage and the second electricity storage;
    a switching unit comprising:
        a first switch configured to switch between a conductive state and a non-conductive state of one of the paths, and
        a second switch configured to switch between a conductive state and a non-conductive state of the other of the paths; and
    an electric load of a vehicle that is connected to the first electricity storage side of the switching unit,
    wherein, when actuation of the electric load is determined to have a possibility of requiring higher voltage than normal, a remaining amount of charge in the second electricity storage is increased in advance.

2. The power supply system control device according to claim 1,
    wherein an increase in a frequency of actuation of the electric load is determined to correspond to an increase in the possibility that actuation of the electric load requires higher voltage than normal.

3. The power supply system control device according to claim 2,
    wherein the remaining amount of charge in the second electricity storage is gradually increased in correspondence with an increase in the frequency of actuation of the electric load.

4. The power supply system control device according to claim 1,
    wherein a lower limit of the remaining amount of charge in the second electricity storage is increased so as to increase the remaining amount of charge in the second electricity storage.

5. The power supply system control device according to claim 1,
    wherein a minimum power generation voltage of the electric generator is increased so as to increase the remaining amount of charge in the second electricity storage.

6. A power supply system control method for controlling a power supply system, the power supply system comprising:
    an electric generator;
    a first electricity storage configured to be charged with and to discharge electric power generated by the electric generator;
    a second electricity storage configured to be charged with and to discharge the generated electric power;
    two paths connecting between the first electricity storage and the second electricity storage;
    a switching unit comprising:
        a first switch configured to switch between a conductive state and a non-conductive state of one of the paths, and
        a second switch configured to switch between a conductive state and a non-conductive state of the other of the paths; and
    an electric load of a vehicle that is connected to the first electricity storage side of the switching unit,
    the power supply system control method comprising:
    determining whether actuation of the electric load has a possibility of requiring higher voltage than normal; and
    increasing a remaining amount of charge in the second electricity storage in advance when actuation of the electric load has the possibility of requiring higher voltage than normal.

\* \* \* \* \*